March 7, 1944.     W. C. WEBER     2,343,836
MULTITRAY CLARIFICATION
Filed Aug. 25, 1941     2 Sheets-Sheet 2
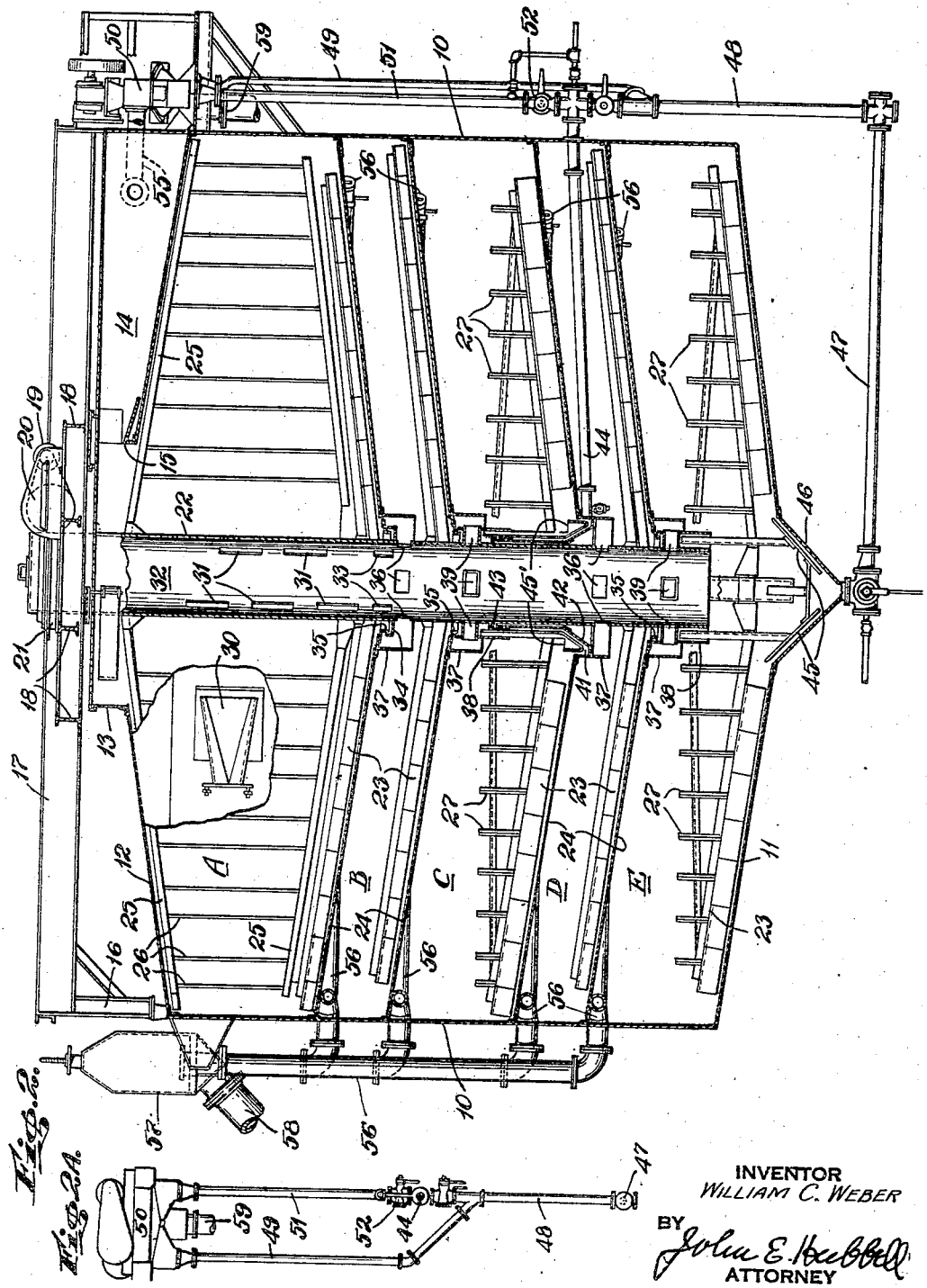
INVENTOR
WILLIAM C. WEBER
BY
ATTORNEY Patented Mar. 7, 1944

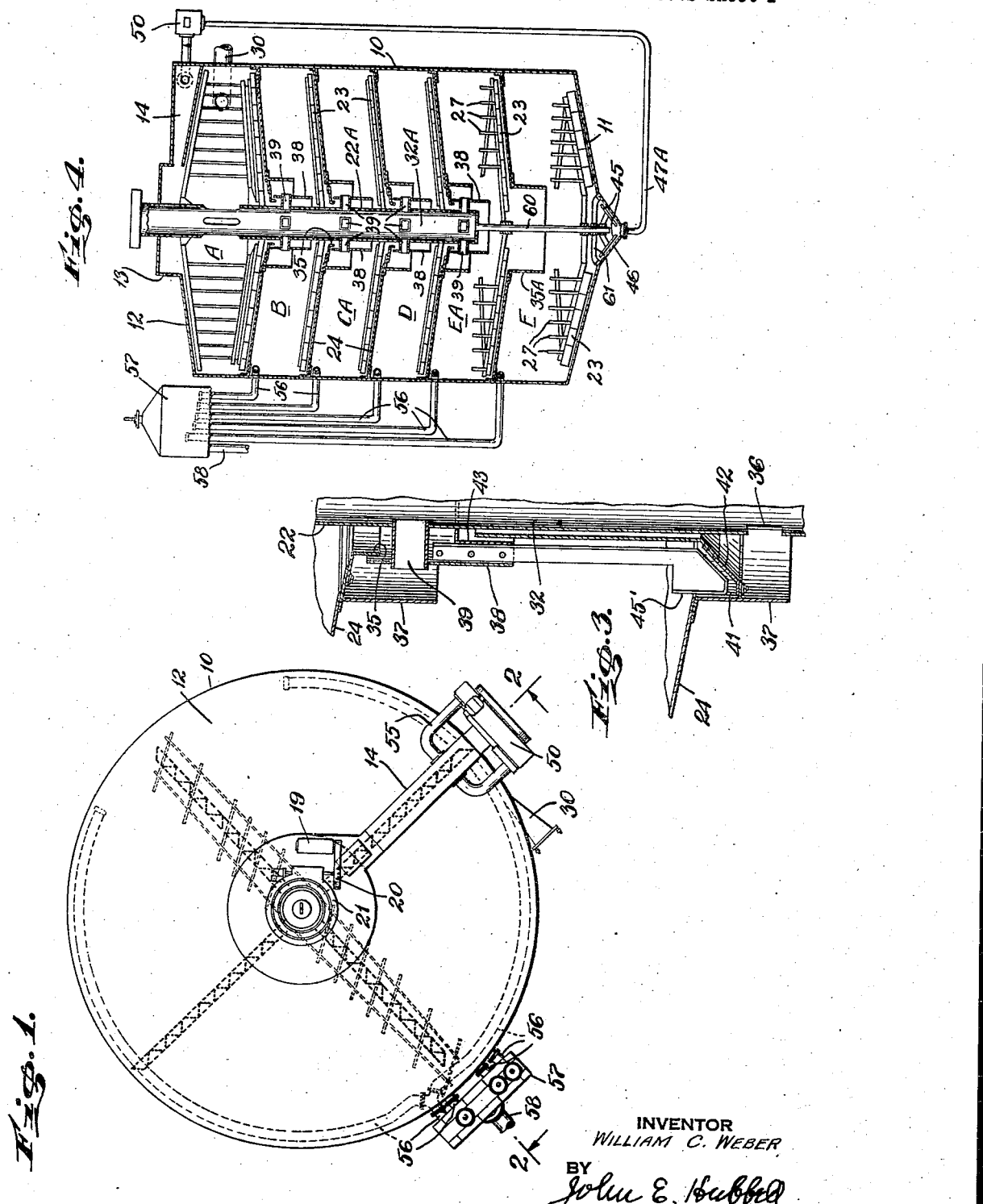

2,343,836

UNITED STATES PATENT OFFICE 2,343,836

MULTITRAY CLARIFICATION

William C. Weber, Westport, Conn., assignor to The Dorr Company, New York, N. Y., a corporation of Delaware Application August 25, 1941, Serial No. 408,219

11 Claims. (Cl. 210—55)

The general object of the present invention is to provide an improved method of and means for the sedimentation in superposed compartments of solids suspended in liquids, and for the thickening and removal of the sedimented solids. Although the invention is adapted for other uses, it was devised primarily for use in the clarification of juices or liquids to be treated incident to the production of cane and beet sugar.

More specifically, the object of the present invention is to increase the solids thickening capacity, relative to the sedimentation and clarified liquid removal capacity, of a multitray clarifier adapted for use in accordance with the method disclosed and claimed in the Rolston Patent 2,195,739 of April 2, 1940, and having separate feed and solids discharge channels formed in the central column portion of the rotating structure which support the mud rakes in the different clarifier compartments, in the general manner disclosed and claimed in Patent 2,253,543 of August 30, 1941, granted on an application filed jointly by William E. Geissler and me on August 30, 1938.

The method of the above-mentioned Rolston patent is characterized primarily by the supply of liquid to the different superposed compartments of the multitray clarifier and the removal of settled solids, commonly called "mud," from the said compartments through separate flow paths, in such manner that the amount of liquid fed to and clarified in each of said compartments may be controlled by regulating the rate of outflow of clarified liquid from the compartment.

The above-mentioned Weber and Geissler application discloses a multi-tray clarifier especially devised for use in the practice of the Rolston method, and characterized by its provisions for feeding liquid to be clarified to the different clarifying compartments from a superposed conditioning or flocculation chamber, through a feed channel or channels formed in the central column portion of the rotating structure supporting the mud rakes provided in the different compartments to work the solids settling therein through outlets opening to a solids discharge channel or channels also formed in said central column. The solids separated from the clarified liquid in each upper clarifying compartment are discharged into the lowermost clarifying compartment in which the solids are subjected to a thickening action which may be wholly due to suitably prolonged subsidence or may be due in part to subsidence and in part to the action of thickening elements carried by the rotating structure.

The primary object and effect of the Rolston method is to increase the clarifying capacity of the lower clarifying compartments relative to the uppermost clarifying compartment of a multitray clarifier and thereby to increase the overall clarifying capacity of a clarifier of given bulk. A further increase in the clarifying capacity of a multitray clarifier constructed and operated in accordance with the disclosure of the Weber and Geissler application is obtainable through the effective flocculation which may be effected in the upper flocculation chamber of such a clarifier, coupled with capacity of the clarifier to pass the flocculated liquid from said chamber to the subjacent clarifying compartments, with little disintegration of the larger flocs formed in the flocculating chamber.

In the conjoint use of the inventions disclosed and claimed in the above-mentioned Rolston patent and in the Weber and Geissler application, it has been found that a multitray clarifier including four or more superposed clarifying compartments will separate more solids from the liquid undergoing clarification than can be suitably thickened preparatory to their removal from the clarifier in the single bottom thickening compartment of such a clarifier as is shown in the Rolston patent or Weber and Geissler application.

In accordance with the present invention, I increase the solids thickening capacity of a multitray clarifier by providing special solids thickening means in at least two of the superposed compartments which serve as thickening chambers for thickening solids separated from the clarified liquid in said chambers, and in other compartments respectively above the thickening chambers and serving as preliminary sedimentation chambers.

In a preferred form of the present invention means are provided for separately withdrawing from each thickening chamber of the clarifier solids thickened therein. In this form of the invention each of the thickening chambers advantageously receive sedimented solids from one or more immediately adjacent preliminary sedimentation chambers above the thickening chamber.

In another desirable form of the present invention solids are allowed to accumulate and are subjected to the action of special thickening means in the compartment immediately above the bottom compartment of the clarifier, as well as in said bottom compartment, both of said compartments thus serving as thickening chambers. In the last mentioned form of the invention, the solids thickened in the upper of the two thickening chambers are passed into the lower thickening chamber and means are provided for discharging from the last mentioned chamber all of the solids sedimented and thickened in the clarifier.

Various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred improvements of the present invention.

Of the drawings:

Fig. 1 is a somewhat diagrammatic plan view of one form of my improved clarifier; Fig. 2 is a vertical section on the line 2—2 of Fig. 1; Fig. 2A is a diagrammatic elevation on a different plane of a portion of the apparatus shown in Fig. 2; Fig. 3 is an enlarged reproduction of a portion of Fig. 2; and Fig. 4 is a somewhat diagrammatic sectional elevation of a clarifier embodying a modified form of the present invention.

In the drawings and referring first to the form of the invention shown in Figs. 1 and 2, 10 designates a substantially round upstanding tank having a bottom 11, preferably somewhat dished so as to slope toward the center, and having a top wall or cover 12, as is customarily desirable when the clarifier is used in the clarification of hot sugar juice. A scum chamber 13, extends upwardly from the cover 12 and is in open communication through the latter with the uppermost compartment A of the tank. A closed launder or conduit 14, receives scum rising in the chamber 13 and passing over a weir 15, and conducts the scum toward a point of ultimate disposal.

Spaced above the scum chamber 13, and supported from the tank top 12 by suitable legs 16, is a bridge or platform structure comprising horizontal beams 17 and transversely extending beams 18. Said platform structure supports actuating means comprising a motor 19, power transmission mechanism 20 and stationary bearing means 21, for a rotating structure which is rotatably supported by said bearing means and comprises a central column 22 and mud rakes 23, supported by the central column.

The interior of the tank 10 is divided by a series of substantially horizontal dished trays or partitions 24, into a plurality of superposed compartments, comprising an upper flocculating compartment or feed chamber A, and subjacent compartments, B, C, D and E. In each of the latter a substantial amount of sedimentation occurs in the normal contemplated use of the clarifier. Mud rakes 23 are provided in each of the different compartments A, B, C, D and E, although only a relatively small amount of sedimentation is effected in the flocculation compartment A in normal operation. The mud rakes 23 in each compartment work the solids settling in the lower portion of the compartment toward a solids outlet at the center of the compartment. As the mud rakes may be of any usual or suitable form, further description thereof is unnecessary herein.

Arms 25 above the mud rakes 23 in the compartment A, support uprising flocculation blades or paddles 26, arranged at different distances from the axis of the rotating structure. The mud rakes 23 in the bottom compartment E, support and give motion to special mud thickening elements in the form of blades or pickets 27 each secured at its lower end to and extending upward vertically from the corresponding mud rake arm 23. Similar special mud thickening elements or pickets 27 are supported by and extend upward from the mud rake arms 23 in compartment C which is separated from the bottom compartment E by the intervening compartment D.

As shown, the liquid to be clarified is introduced into the flocculating compartment A through a nozzle 30, adjacent and tangential to the peripheral wall of the compartment. Advantageously the nozzle 30 is arranged to discharge the feed into the compartment A in a tangential direction opposite to the movement of the tips of the flocculation arms 25 and in such a manner that the velocity of liquid flow relative to paddles 26 may be of the order of 1.5 feet per second, in accordance with the invention of my prior application, 347,837, filed July 27, 1940, notwithstanding the relatively slow angular movement of the rotating structure desirable for mud raking purposes.

The central column 22 is hollow and comprises a body portion in the form of the metallic tube or pipe to which the mud rake and flocculating arms are attached. The tube or column wall is formed with a plurality of feed inlet ports 31 located at different levels above the bottom wall of the compartment A, through which feed liquid of the compartment A passes from the compartment A into the bore or hollow interior 32 of the column. The tube wall is also formed with mud inlet ports 33 adjacent the bottom level of the central portion of compartment A, through which the small amount of mud settling out of the liquid in the compartment A passes into the feed channel 32, and thence, under the action of gravity, into the compartment E. The quantity of mud passing into the feed channel 32 through the ports 33 is too small to be practically objectionable. The provision of the mud outlet ports 33 for the compartment A in the central column wall, makes it possible to provide a mud seal between the centre column and the margin of the central opening in the partition 24 between the compartments A and B and thereby avoid leakage of feed liquid into the compartment B from the compartment A along a flow path in which flocs in the feed liquid might be subjected to objectionable disintegration.

The said means for forming the said mud seal between the compartments A and B comprises an annular flange 34 carried by and extending radially away from the central column 22 and having its peripheral edge upturned to form a seal chamber into which extends a depending flange or boot portion 35 of the partition 24 at the periphery of the central opening in the latter.

The central feed channel 32 is formed with feed outlet openings 36 in its wall, which open to the compartment B in the upper central portion thereof, and within the receiving chamber surrounded by cylindrical flange 37. The latter is attached at its upper end to the top wall of the compartment B, and is open at its lower end to said compartment about half way between the adjacent portions of the top and bottom walls of the compartment, and is considerably larger in diameter than the feed channel 32.

The solids or mud settling out of the liquid in the compartment B passes through central opening in the bottom wall of the latter into the subjacent compartment C through an annular mud channel which surrounds the tubular body portion of the central column 22 and is surrounded by a tubular member 38 which is supported from the tubular body of the central column by feed tubes 39, each of which is secured at one end to, and extend radially away from the central column body. The tubes 39 are open at their inner ends to the feed channel 32 in the column 22, and open at their outer ends into a corresponding feed receiving chamber surrounded by a cylindrical flange 37, similar to that in the compartment B. The upper edge portion of the cylindrical flange 38 surrounds and is in telescopic relation with the depending boot portion 35 of the partition 24 between the compartments B and C.

Mud settling in the lower portion of the compartment C and worked toward the centre of that compartment by the corresponding mud rakes 23, enters an annular mud trough 41 formed by the cylindrical flange 37, depending from the partition 24 between the compartments C and D. The inner wall of the trough 41 is formed by the lower conical portion of a member 42 which has its lower, large diameter end within and secured to the surrounding flange part 37. The upper portion of the member 42 is cylindrical and has an internal diameter slightly larger than the external diameter of the tubular body portion of the column 22. The upper end of the cylindrical portion of the member 42 extends into an annular pocket open at its lower end and formed by a hood member 43. The latter is carried by the central column body 22 and comprises a flange extending radially away from the body 22 and a depending cylindrical portion surrounding and spaced away from the upper end portion of the part 42. Mud scraper arms 45′ secured to and depending from the hood member 43, extend into and comprise scraper portions alongside the side walls of the trough. The means shown for withdrawing mud from the mud trough 41 comprises a separate mud outlet pipe 44 extending radially away from the outer wall of the mud pocket to and through the tank wall 10.

Liquid to be clarified is fed into the compartment D through outlet openings 36 in the wall of the central feed channel 32, which are similar in form and disposition to those through which the compartment B is fed. Mud worked to the centre of the lower portion of the compartment D passes into the lowermost compartment E through an annular mud channel between the central column body 22 and a surrounding cylindrical member 38, as mud passes into the compartment C from the compartment B. The cylindrical member 38 in the compartment E is supported by radial feed tubes 39 in communication with the feed channel 32 which open at their outer ends into a feed chamber surrounded by a cylindrical member 37 connected at upper end to top wall 24 of compartment E, all arranged as are the feed provisions for the compartment C.

As shown, the feed channel 32 in the hollow column body 22 is open at its lower end to the compartment E at a level somewhat below that of the tops of the mud thickening pickets 27. At its lower end the central column supports inclined scraper blades 45 alongside the inner wall of the central conical mud outlet portion 46 of the tank bottom wall 11. At its lower end said conical mud outlet portion 46 is connected in the usual manner to a horizontally disposed mud outlet pipe 47. The latter is shown as connected by uprising pipe sections 48 and 49 to one inlet of the customary duplex mud pump 50. The latter has a second inlet connected through a pipe section 51 and valve 52 to the outer end of the pipe 44 through which mud is discharged from the compartment C.

As shown, the mud pump 50 has outlet pipes 55 opening into the launder 14 and the latter communicates with a discharge pipe 59 extending downwardly below the pump 50.

Each of the compartments B, C, D and E serves as a clarifying compartment and is provided with a corresponding clarified juice outlet pipe 56 shown as communicating externally of the tank 10 with a clarified liquid overflow box 57 which may be formed in the usual manner and comprises provisions of the usual form for independently regulating the amounts of clarified liquid withdrawn from the different clarifying compartments, and includes a clarified juice outlet 58.

The general operation of the apparatus shown in Figs. 1 and 2 will be readily apparent to those familiar with the operation of prior multi-tray clarifiers employed in the clarification of cane sugar juices and for analogous purposes.

The relative portions of the liquid entering the compartment A through the tangential feed nozzle 30 which are passed to and clarified in the different clarifying compartments, may be regulated by the adjustment of the clarified liquid outflow provisions in the clarifying liquid overflow box 57, exactly as in any multi-tray clarifier heretofore operated in accordance with the method of the Rolston patent. As will be apparent, the distribution of feed among the different compartments A, B, C, D and E, will not be modified or affected by the provisions disclosed for normally thickening in and discharging from the compartment C all of the mud settling out of the liquid in that compartment or received therein from the compartment B. In the normal operation of the clarifier arrangement shown in Figs. 1-3, approximately one-half of the solids separated from the liquid clarified is thickened in and discharged from the compartment C.

The mud thickening capacity of the clarifier is thus approximately double what it would be if all of the solids were thickened in the bottom compartment E. In consequence the mud thickening and discharge capacity of the clarifier, is ample to permit operation of the clarifier at its maximum sedimentation capacity. The invention thus gives the practical advantage and result of a substantial increase in the overall capacity of the clarifier.

It is particularly to be noted that the provision of the special mud thickening means for, and a separate mud draw-off connection to, each of a plurality of the clarifying compartments, makes it practically possible to thicken and remove the settled solids or muds at substantially the same rate at which the solids are settled. As a result of this, the clarifying capacity of the different compartments need not be impaired by objectionably large mud accumulations therein, and it is practically possible to avoid detrimental results of prolonged retention of stagnant solids in a sedimentation space which in the clarification of cane sugar juice causes inversion and fermentation.

The modified embodiment of the invention shown somewhat diagrammatically in Fig. 4, is similar in most of its features to the clarifier shown in Figs. 1–3. In the drawings, corresponding parts of the two clarifiers which present no noteworthy differences in form, are designated by similar reference numbers, the letter A being added to a few of the reference numbers of Fig. 4, which designate parts corresponding generally to parts of the construction first described, but differing therefrom in some respects hereinafter mentioned.

In Fig. 4 the partitions or trays 24 divide the interior of the tank 10 into superposed compartments A, B, CA, D, EA and F. The compartment CA differs from the compartment C of the construction first described, in that in includes no special mud thickening means and is not provided with a mud takeoff tray, and is, in fact, a replica of the compartments B and D. In Fig. 4 each of the compartments A, B, CA and D, is in communication with the immediate subjacent compartment B, CA, D and EA, respectively, through a corresponding annular mud channel section formed by a cylindrical member 38 surrounding and spaced away from the central column body tube 22A, and in telescopic relation with the boot 35 depending from and surrounding the central opening in the partition 24 above the compartment, each such mud channel section is similar in form and construction to the mud channel section connecting the compartments B and C of the construction first described.

In Fig. 4, the feed to each of the compartments B, CA, D and EA from the flocculation chamber A, is through the central column feed channel 32A and the radial pipes 38 supporting the corresponding cylindrical member 38, but in normal contemplated operation of the clarifier shown in Fig. 4, there is no direct feed of clarified liquid into the bottom compartment F from the central column feed channel 32A. As shown, the central column tubular body terminates within the compartment EA and has its lower end closed except for an axial tubular extension 60 of much smaller diameter which extends down to the level of the bottom mud outlet cone 46. The tube 60, which is open at its ends, is adapted to pass any sand or other solids settling out of the liquid in the feed channel 32A into admixture with the mud being thickened in and discharged from the compartment F. As shown tube 60 also supports the bottom cone scrapers 45 and extends through a bearing bracket 61 secured to the tank bottom wall 11 and thus provides a lower guide bearing for the central column assembly.

The compartment EA of Fig. 4 includes mud rake and mud thickening means like those in the bottom compartment E of Fig. 2 and differs from the latter essentially only in that it is not the lowermost or bottom compartment of the clarifier and discharges mud into the subjacent compartment F through a central opening in the tray 24 between the compartments and the depending boot 35A from that tray which surrounds the central opening in the tray and advantageously as it is shown is appreciably longer than generally similar boots 35 carried by the upper trays 24.

The upcast boot 42 in conjunction with the hood member 43 provides a mud sealed overflow passage for the discharge of thickened solids from the compartment C during periods in which the mud level in that compartment is unduly high. Such an increase in mud level height ordinarily results from the fact that the clarifying load on the compartments B and C is undesirably high relative to the clarifying loads on the subjacent compartments D and E. The mud overflow into the compartment D from the compartment C under such circumstances, effects a temporary improvement in the load distribution and minimizes the tendency of the mud accumulation in the compartment C to interfere with the regular operation of that compartment.

The lower compartment EA of Fig. 4 includes mud rakes 23 carrying thickening pickets 27 and connected to and rotated by the tubular portion 60 of the central column, which may be similar in construction and operation to the mud rake and thickening means in the bottom compartment E of the clarifier shown in Fig. 2. The compartment F of Fig. 4 is provided with a clarified juice drawoff piping 56 for the removal of clarified liquid accumulating in the upper portion of the compartment, since considerable amounts of clarified liquid will separate from the solids and liquid mixture entering the compartment F, largely as a result of subsidence and partly due to the action of the mud rake and thickening means therein in releasing and providing upflow paths for liquid entrapped in the interstices between wet masses of thickened solids. The elongated boot 35A separates the clarifying juice receiving space in the upper portion of the compartment F from the central flow path for the solids and liquid mixture entering compartment F from compartment EA. The effective utilization of the compartment EA as a thickening compartment requires the clarified juice outlet pipe 56 from the compartment E to discharge at a level higher relative to the discharge level of the outlet pipe 56 for the compartment EA, than would be required if the compartment EA were not used as a thickening compartment and discharged mud of lower density.

While I now consider the clarifier shown in Figs. 1 and 3 to be generally preferable, at least for most uses, to the clarifier shown in Fig. 4, the last mentioned clarifier gives the same general advantages as the clarifier first described, of increasing the mud thickening and removal capacity of the clarifier relative to its sedimentation capacity, and thereby increases the overall clarifying capacity of the clarifier.

As will be apparent to those skilled in the art, changes may be made in the form of the apparatus described without departing from the spirit of the invention as set forth in the appended claims. In this connection, we note that some of the differences in construction between the clarifiers shown in Figs. 2 and 4, are obviously not due to the differences in the mud thickening and removal provisions of the two clarifiers. For example, the mud seal means including the annular flange 34, between the compartments A and B of Fig. 2 might be used between the compartments A and B of the clarifier shown in Fig. 4, in which case the central column body 22A would be provided with feed ports like the ports 23 of Fig. 2. Moreover, the general operation of the clarifier shown in Fig. 2 would not be modified if the seal flange 34 and ports 33 were omitted, and the compartments A and B of Fig. 2 were connected by an annular flow path as are the compartments A and B of Fig. 4.

Having now described my invention, what I claim as new and desire to secure by Letters Patent is:

1. In clarifying liquid in a multitray clarifier comprising a plurality of superposed compartments, two or more of which serve as thickening chambers and others of which serve as preliminary sedimentation chambers, each of the last mentioned chambers being located above one at least of said thickening chambers, the method which consists in passing liquid to be clarified into each of said chambers and separately withdrawing clarified liquid from the different chambers, passing mud from each preliminary sedimentation chamber to a subjacent thickening chamber at a rate rapid enough to avoid impairment of the clarifying capacity of said preliminary sedimentation chamber, said mud comprising a solids content including the solids from the clarified liquid withdrawn from said preliminary sedimentation chamber and comprising a liquid content constituting a portion at least of the liquid passed into said preliminary sedimentation chamber to be clarified therein, and subjecting the mud in the thickening chamber to a regulated mud thickening action by withdrawing mud from said thickening chamber at a regulated rate slow enough to maintain the mud thickening condition in said mud thickening chamber required for the desired mud thickening action.

2. In clarifying liquid in a multitray clarifier comprising a plurality of superposed compartments, of which the lower one and one at a higher level serve as thickening chambers and others between and above said thickening chambers serve as preliminary sedimentation chambers, the method which consists in passing liquid to be clarified into each of said chambers and separately withdrawing clarified liquid from the different chambers, passing mud from each preliminary sedimentation chamber to a subjacent thickening chamber at a rate rapid enough to avoid impairment of the clarifying capacity of said preliminary sedimentation chamber, said mud comprising a solids content including the solids separated from the clarified liquid withdrawn from said preliminary sedimentation chamber and comprising a liquid content constituting a portion at least of the liquid passed into said preliminary sedimentation chamber to be clarified therein, and subjecting the mud in each thickening chamber to a regulated mud thickening action by separately withdrawing mud from the different thickening compartments at regulated rates each suitably small to maintain the mud thickening condition in the corresponding mud thickening chamber required for the desired mud thickening action therein.

3. A multitray clarifier comprising a tank and partitions therein separating a plurality of superposed compartments two or more of which serve as thickening chambers and the others of which serve as preliminary sedimentation chambers, feeding means including a separate feed inlet to each preliminary sedimentation chamber for passing liquid to be clarified into each of said chambers, a separate conduit connection to each chamber for the outflow therefrom of clarified liquid, means for moving mud from each preliminary sedimentation chamber into a subjacent thickening chamber at a rate rapid enough to avoid impairment of the clarifying capacity of said preliminary sedimentation chamber, said mud comprising a solids constituent including the solids separated in the last mentioned chamber from the liquid clarified therein and comprising a liquid constituent constituting a portion at least of the liquid fed into said preliminary sedimentation chamber for clarification therein and means for subjecting the mud in said thickening chambers to a mud thickening action comprising means for removing the mud thickened in said thickening chambers from the clarifier at a rate regulable to maintain the desired thickening action.

4. A multitray clarifier as specified in claim 3 having a preliminary sedimentation chamber interposed between two thickening compartments and comprising separate off take conduit connections to said two thickening chambers through which solids thickened therein are separately removed from the clarifier.

5. A multitray clarifier as specified in claim 3 in which the lowermost compartment and the compartment immediately above it serve as thickening chambers and which comprises means for passing thickened solids into the lowermost compartment from the thickening chamber immediately above it and comprises an off take connection to the lowermost compartment for the discharge of thickened solids from the clarifier.

6. A multitray clarifier as specified in claim 3 in which each of said partitions is formed with a central aperture and which comprises a rotatable structure including a central column portion extending through said central tray apertures and formed with separate feed and mud channels formed in said column portion respectively included in the feeding means and in the second mentioned means of claim 3, means for rotating said rotatable structure, said rotatable structure also including mud rakes in each of the different chambers of the clarifiers for working solids to the center of the chamber and including solid thickening elements in each thickening chamber of the clarifier.

7. A multitray clarifier as specified in claim 3 having a preliminary sedimentation chamber interposed between two thickening chambers and comprising separate off take conduit connections to said two thickening chambers through which solids thickened therein are separately removed from the clarifier and in which the partition separating the upper thickening chamber and the preliminary sedimentation chamber interposed between the thickening chambers is formed with a central opening and an upcast boot carried by said partition and surrounding said opening whereby solids accumulating in the upper thickening chamber may overflow through said opening into the subjacent chamber.

8. A multitray clarifier as specified in claim 3 having a preliminary sedimentation chamber interposed between two thickening chambers and comprising separate off take conduit connections to said two thickening chambers through which solids thickened therein are separately removed from the clarifier and in which the partition separating the upper thickening chamber and the preliminary sedimentation chamber interposed between the thickening chambers is formed with a central opening and an upcast boot carried by said partition and surrounding said opening, and means including a part surrounding the upper portion of said boot which unite with the latter and with said central opening to form a mud sealed overflow outlet from the upper thickening chamber into the subjacent chamber.

9. In a multitray clarifier comprising a tank and partitions therein separating a plurality of superposed compartments, a separate conduit connection to each of said compartments for the outflow of clarified liquid, feeding means including a separate feed inlet to each of said compartments for passing liquid to be clarified thereinto, means for withdrawing mud from the clarifier including a mud withdrawal conduit connection to a compartment located above the lowermost compartment and serving as a mud thickening chamber and a separate mud withdrawal conduit connection to the lowermost compartment, the partition forming the bottom wall of said mud thickening chamber being formed with an opening, means comprising an upcast boot surrounding said opening and normally operative to prevent the downflow of mud from said thickening chamber into the subjacent compartment through said opening, and a hood extending over the top of the upcast boot and uniting with the latter to form a mud sealed passage through which mud overflows from said thickening chamber to the subjacent compartment on a predetermined increase in the mud accumulation in said thickening chamber.

10. A multitray clarifier comprising a tank and partitions therein separating a plurality of superposed compartments, a plurality of which serve as thickening chambers and other of which serve as clarifying chambers, means feeding liquid to the clarifier to be clarified therein, means for distributing said liquid to be clarified to the different compartments, a separate conduit connection to each compartment for the outflow of clarified liquid, means for passing solids separating from the liquid in the clarifying chambers into the thickening chambers, and means for withdrawing from each of the thickening chambers solids thickened therein at a rate regulating the extent to which the solids are thickened in said thickening chamber.

11. A multitray clarifier as specified in claim 3, including mechanical thickening elements in each thickening chamber and means for rotating said elements.

WILLIAM C. WEBER.